United States Patent [19]

Steiger

[11] Patent Number: 5,198,415

[45] Date of Patent: Mar. 30, 1993

[54] NONTOXIC, NONCHLORIDE, WATER-BASE, INHIBITIVE FLUID TO STABILIZE WATER SENSITIVE SHALES

[75] Inventor: Ronald P. Steiger, Houston, Tex.

[73] Assignee: Exxon Production Research Company, Houston, Tex.

[21] Appl. No.: 641,415

[22] Filed: Jan. 15, 1991

[51] Int. Cl.$^5$ ............................................. C09K 7/02
[52] U.S. Cl. ........................................ 507/103; 507/139
[58] Field of Search ............... 252/8.51, 8.511, 8.513, 252/8.514; 507/103, 139

[56] References Cited

U.S. PATENT DOCUMENTS

| | | | |
|---|---|---|---|
| 2,191,312 | 2/1940 | Cannon | 252/8.5 |
| 2,474,330 | 6/1949 | Salathiel | 252/8.5 |
| 3,277,971 | 10/1966 | Dawson et al. | |
| 3,843,524 | 10/1974 | Perricone et al. | 252/8.5 |
| 4,400,649 | 3/1984 | Loftin et al. | 252/8.5 C |
| 4,536,297 | 8/1985 | Loftin et al. | 252/8.5 C |
| 4,647,859 | 3/1987 | Son et al. | |
| 4,780,220 | 10/1988 | Peterson | 252/8.514 |
| 4,828,726 | 5/1989 | Himes et al. | |
| 4,839,096 | 6/1989 | Dennis et al. | |
| 5,004,562 | 4/1991 | Kissel | 252/518 |

OTHER PUBLICATIONS

Cotton, F. A. and Wilkinson, G., *Advanced Inorganic Chemistry*, N.Y., John Wiley & Sons, 1980, pp. 268-269.

*Primary Examiner*—Gary L. Geist
*Attorney, Agent, or Firm*—Susan A. McLean

[57] ABSTRACT

A nontoxic, nonchloride, water-base drilling fluid which stabilizes water sensitive shales is disclosed. This drilling fluid is comprised of the potassium or ammonium salt of an organic acid in combination with a polar organic liquid, so as to reduce shale swelling with mineral adverse impact on the environment.

4 Claims, 9 Drawing Sheets

NONTOXIC, NONCHLORIDE, WATER-BASE, INHIBITIVE FLUID TO STABILIZE WATER SENSITIVE SHALES

BACKGROUND OF THE INVENTION

This invention is directed to fluids used for the drilling of wells. In particular, this invention provides a drilling fluid comprising a polar organic compound, as well as water soluble potassium or ammonium salts of organic acids. When mixed in proper proportions, these two components will provide a drilling fluid which is not toxic, contains no chloride, and is inhibitive with respect to clay hydration and swelling. The fact that it is of no or low toxicity makes it extremely useful in that it reduces environmental concerns. Its inhibitive qualities result in the reduction of water transferring to the shale defining the wellbore, yielding in an increased stability of water sensitive shales.

It is well known in the art that drilling fluids must be used in connection with the drilling of wells, such as those wells used in the oil and gas industry. Such drilling fluids serve several functions in the drilling process. These functions include: removal of drilled cuttings, sealing of the sides of the well bore so as to minimize drilling fluid loss into the formation, provision of a hydrostatic head to prevent blowouts from high pressure fluids entering into the wellbore and flowing to the surface, creation of a low-friction surface on the well bore to facilitate rotation and removal of the drill string as operational conditions require, cooling of the drill bit, and lubrication to prevent the drill pipe from sticking during rotation.

Drilling fluids have typically been colloidal suspensions of certain viscosifiers and filtration control materials, such as clays, as well as of fine drilled solids, in either oil or water, as is well known in the art. Various chemicals are added to alter, enhance, influence or modify the properties of this suspension, using techniques which are known to one skilled in the art. For example, a weighting agent, such as barium sulfate, commonly known as "barite," is added to increase the density of the fluid. Gellants are used to increase viscosity and gel strength and provide suspension properties. Filtration control materials, such as soluble polymers or asphaltic materials, are added to encourage the development of the filter cake on the sides of the wellbore so that a minimal amount of the drilling fluid will enter a permeable formation.

One of the concerns in using a water-based drilling fluid is that, often, the shales through which the well is being drilled are very sensitive to water. These shales absorb water easily and such absorption renders them highly unstable. Thus, when the shales become hydrated, they tend to create an unstable wellbore, frequently resulting in a collapse of the wellbore. This difficulty renders the use of water-based drilling fluids undesirable in such shales. Shale stabilization is believed to be at least partially dependent upon inhibition of swelling of the shale, and dispersion of the shale into the fluid. The amount of swelling to be experienced varies from shale type to shale type. By "inhibition" is meant the ability of a process or a drilling fluid to retard hydration of the shale adjacent to the wellbore whereby the shale remains intact and basically in its original size, shape and volume, said process being the manufacture of an inhibitive fluid suspension and using that suspension as a drilling fluid. In such cases, oil-based drilling fluids are frequently used in an effort to control the water in the drilling fluid, and, thus, to minimize shale destabilization. However, as the environmental impact of the disposal of these oily spent slurries, and the drilled cuttings carried by these slurries, has become increasingly scrutinized, inhibitive water-based fluids have become more and more the fluid of choice in the industry. Inhibitive water-base drilling fluids that contain potassium chloride have been used as alternatives to oil-base systems. However, environmental concerns about high levels of chloride ions have limited disposal of spent fluid in onshore drilling operations. Environmental concerns about potassium chloride toxicity at high concentrations to mysid shrimp have limited disposal of spent fluid and drill cutting in offshore drilling operations.

The drilling fluid of this invention addresses these competing concerns of environmental acceptability of the drilling fluid on the one hand and operational acceptability of the circulating drilling fluid on the other. These concerns are resolved by using a polar organic fluid in conjunction with the potassium or ammonium salt of an organic acid.

The use of polar organic fluids, such as glycerine, in conjunction with certain cations, such as potassium or ammonium salts of organic acids, results in an interaction with the clays in shales to lower their ability to hydrate and swell. This means that the fluid will not interact, or will interact only slightly, with the shales. The net result of this low interaction is that the shales will remain stable. The fact that this is performed without the use of either oil or chloride ions renders the spent drilling fluids, and the drilled cuttings resulting therefrom, safely disposable from an environmental standpoint.

Conventional drilling fluids of the related art, which fluids reduce hydration of the shale formations surrounding the wellbore, are potassium chloride in water-base polymer systems as described by Steiger in *Fundamentals and Use of Potassium/Polymer Drilling Fluids to Minimize Drilling and Completion Problems Associated With Hydratable Clays* published in the August 1982 issue of the Journal of Petroleum Technology. Similarly, U.S. Pat. No. 4,830,765 to Perricone et al. discloses a non-polluting inhibitive drilling fluid which contains water and a water-soluble component selected from the class consisting of polyhydric alcohols, glycol, glycol ethers, polypropylene, polyethylene glycols, ethylene oxide-propylene oxide copolymers, alcohol initiated ethylene oxide-propylene oxide copolymers and/or mixtures thereof, wherein the ratio of said water soluble component in the total liquid phase was between about 5% to about 50% by volume. However, in the Perricone patent, the unexpected benefit of the addition of potassium or ammonium salts of organic acids to the fluid was not recognized.

U.S. Pat. No. 4,780,220, to Peterson, another drilling fluid which uses glycerine is disclosed. Again, that patent does not recognize the benefit of adding potassium or ammonium salts of organic acids to the drilling fluids in addition to the glycerine.

Therefore, while different water soluble synthetic additives, including polar organic fluids, have been used in the petroleum industry in drilling fluids in the past, their use in a drilling fluid in conjunction with potassium or ammonium salts of organic acids has heretofore not been appreciated by those skilled in the art.

The present invention comprises a drilling fluid having a liquid phase which imparts lubricity and shale swelling inhibition properties to the fluid similar to the beneficial properties of oil-based drilling fluids without the accompanying adverse effects, such as high toxicity. These and other benefits of this invention will become apparent to one skilled in the art by review of this specification, examples and claims hereto.

SUMMARY OF THE INVENTION

This invention encompasses the development and use of non-toxic, non-chloride water-based solutions and drilling fluids that contain water-soluble, polar organic compounds, such as alcohols, and water-soluble potassium or ammonium salts of organic acids that interact synergistically to reduce clay/water interaction, shale hydration, swelling and weakening of the rock.

Ion-dipole interaction between potassium or ammonium cations on the one hand and polar organic molecules, such as alcohols, ketones, aldehydes, ethers, nitrites, amides or amines on the other, change the adsorption characteristics of the cations on the clay surfaces and thus reduce the clay/water interaction and clay hydration in a shale. This reduction, in turn, reduces shale swelling, hydration and weakening and wellbore failure or collapse.

Superior non-toxic, non-chloride water-based inhibitive drilling fluid systems that include the potassium salts of organic acids, potassium acetate or potassium citrate, or ammonium acetate, citrate or tartrate; and the polar organic compound, glycerine, have been formulated and tested. As would be apparent to one skilled in the art, similarly beneficial results would be achieved with one of the other organic salts and/or polar organic liquids listed above.

These systems have been developed clay-free with polymer viscosifiers and filtration additives, however, clays such as bentonite or HP-007 could also be used in the system. Confined swelling tests have been conducted on potassium acetate, glycerine, water solutions. The results from several tests are given herein. Tests were run with water, potassium chloride (KCl), potassium chloride and glycerine, potassium acetate (KAc) and potassium acetate and glycerine solutions. Toxicity tests have been conducted on potassium acetate, potassium citrate, glycerine, and water solutions. The results from several tests are given herein.

DESCRIPTION OF THE PREFERRED EMBODIMENT

In the preferred embodiment, the polar organic compound, glycerine, and the potassium salt of an organic acid, potassium acetate, are used in a proportion of about 125 to 250 g/L glycerine and 37 to 75 g/L potassium acetate, No clay is added in the building of the initial drilling fluid; polymer viscosifiers are use to thicken the fluid, and filtration additives and weighting materials, such as barite, are also added.

DESCRIPTION OF THE DRAWINGS

FIG. 1 shows the amount of stress exerted by the shale core when exposed to the tested fluid as a function of time in hours. The upper curve shows the all around external confining pressure on the sample jacket and top endcap as a function of time. The lower curve shows the axial load applied to the core by the load piston as a function of time. At the start of this test the sample was preloaded with a pressure of 1000 psi for a short period to seat the jacket and close any microfractures. The pressure was then dropped to 500 psi and equilibrated before circulating the test fluid around the core sample through the flow channels on the inside of the sample jacket. The graph shows the start time for the water addition at 2.5 hours, the potassium chloride solution start time at 25 hours, the start of the addition of the potassium chloride/glycerine blend solution at 47.5 hours and the free swelling start time at 65 hours.

Similarly.

EXAMPLES

A particular swelling test was run on four different drilling fluid samples: These fluids compared potassium chloride/glycerine; potassium acetate/glycerine; potassium acetate; and glycerine-based drilling fluids, and establish that the use of a potassium compound enhances inhibition dramatically over the use of glycerine alone, and that using potassium acetate, with its more environmentally acceptable properties, yields essentially the same reduction in swelling as does potassium chloride.

Hydratable clays in shales cause them to hydrate and swell upon exposure to water. The swelling pressure generated by a shale in a borehole wall upon exposure to a water-base drilling fluid has a great impact on the relative weakening of the shale and on whether or not the wellbore will fail. We have developed methods and equipment to quantitatively measure shale swelling pressures, swelling strain (i.e. change in sample dimensions) and hydrational behavior of preserved shale core samples upon exposure to one or several drilling fluid filtrates (i.e. the water phase of the drilling fluid). During a swelling test, a triaxial test apparatus with a computer data acquisition and control program is used to measure the swelling pressures generated in all directions by a preserved, confined, jacketed, instrumental shale test core that is exposed to several fluids in sequence. The test fluids are flowed at very low pressures (about 20 psi or less) through flow channels between the core and a protective, plastic jacket attached to the triaxial test core endcaps. A computer feedback system controls the triaxial apparatus to maintain the dimensions of the instrumented core sample to allow no straining or swelling in order to measure a quantitative swelling pressure that develops when the shale hydrates. As the computer senses swelling of the core in the radial and axial directions, it activates a pump to increase the all-around, isostatic confining pressure in the triaxial test cell and thus to apply that confining pressure to the outside of the sample jacket to control and prevent any radial swelling. This is a reaction or opposing pressure to the swelling pressure in the radial direction. It, also, activates the triaxial load piston to apply a load axially to the core sample to prevent axial swelling and to maintain the sample length. This is an additional reaction pressure over the confining pressure in the axial direction to the swelling pressure. Thus, the total swelling pressure that builds up in the core sample in the axial direction is equal to the sum of the axial load and the confining pressure that is required to maintain the original sample dimensions. The dimensions of the core are monitored throughout the test. The radial strains (Et1, Et2) in two orthogonal directions and the axial strain (Ea) are recorded. At the end of the test, the load piston is lifted to allow axial free swelling to occur.

EXAMPLE 1

Figure 1A:
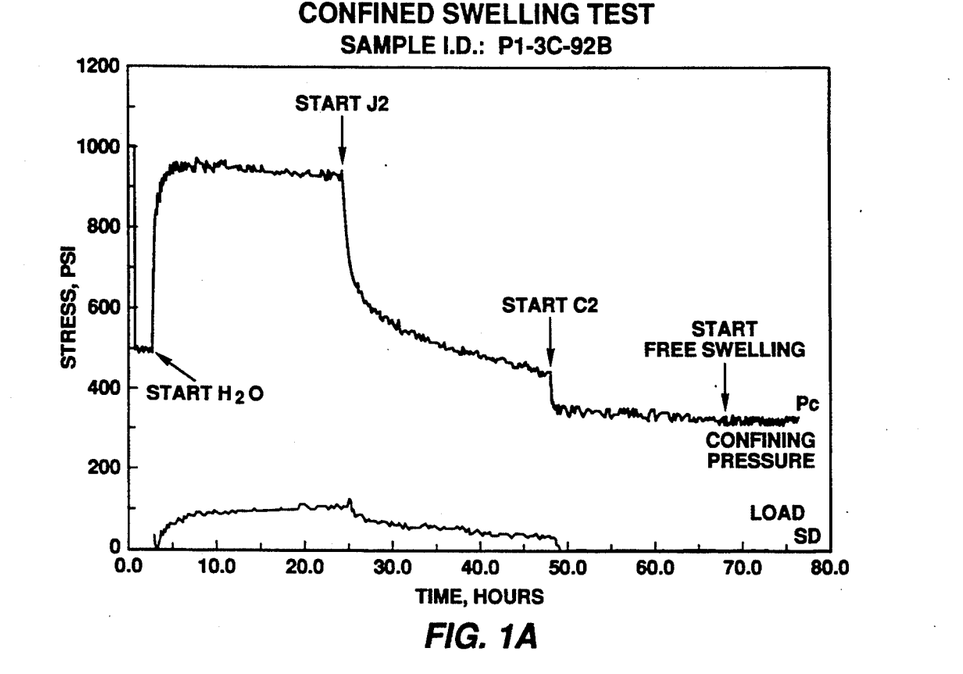
FIG. 1A is a plot of the results of the confined swelling tests performed in example 1. The composition of the fluid tested is set forth in Table 1.
Figure 1B:
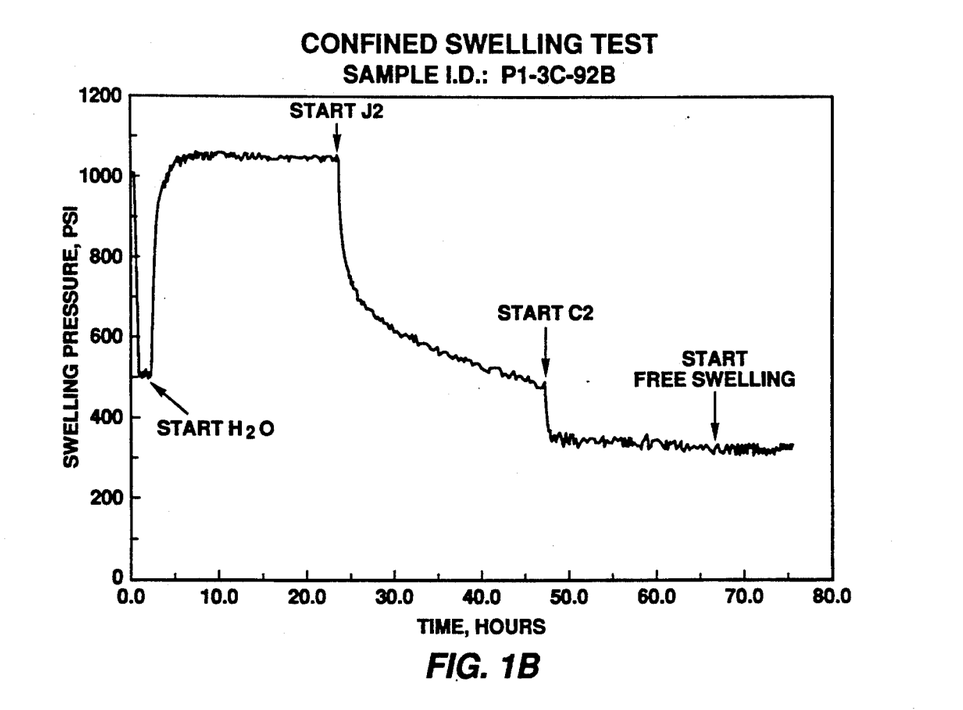
FIG. 1B shows the total axial swelling pressure measured during the same test on this fluid.
Figure 1C:
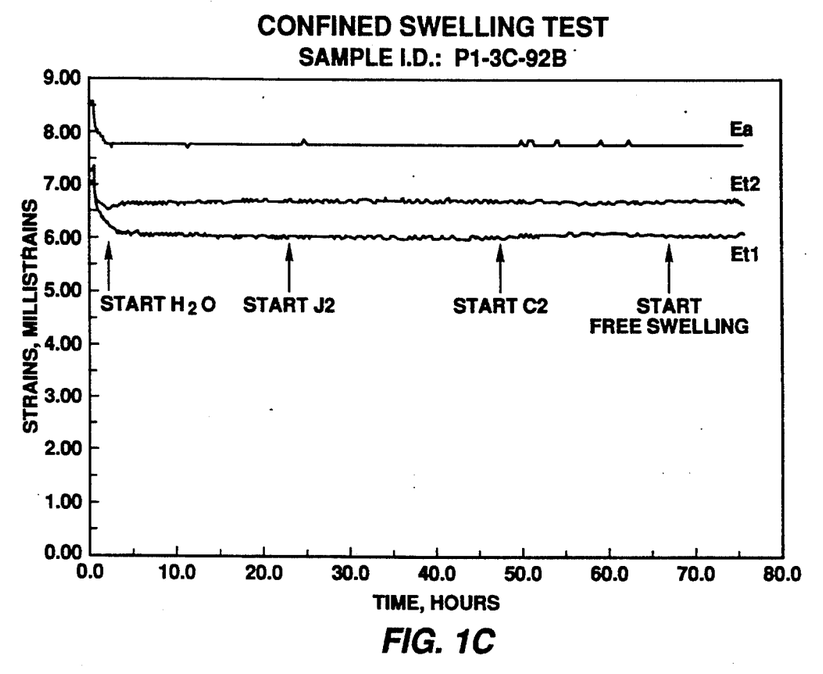
FIG. 1C shows the axial (Ea) and radial (Et1, Et2) strains measured during the same test on this fluid.

Two different drilling fluid solutions were mixed as set forth in Table 1. The confined swelling test set forth above was run, with water addition starting at 2.5 hours, the 57 gram/liter potassium chloride solution at 25 hours, and the potassium chloride/glycerine solution at 47.5 hours. Examination of the results indicates that, upon introduction of the water, swelling pressure rose dramatically. Addition of potassium chloride gradually but dramatically dropped the system's swelling pressure to roughly the initial 500 psi preload value. Finally, the potassium chloride/glycerine solution was added, yielding further improvement in reducing the swelling pressure by 145 psi as shown in FIG. 1B. The addition of 20% glycerine to the KCl produced a reduction in swelling greater than that achieved by addition of 20% glycerine alone (67 psi), as shown by the addition of test solution A-2 in FIG. 6B. The results of this test indicate the level of improvement achievable through the use of potassium chloride alone, and in conjunction with glycerine, for the purpose of comparison with the use of potassium acetate.

EXAMPLE 2

Figure 2A:
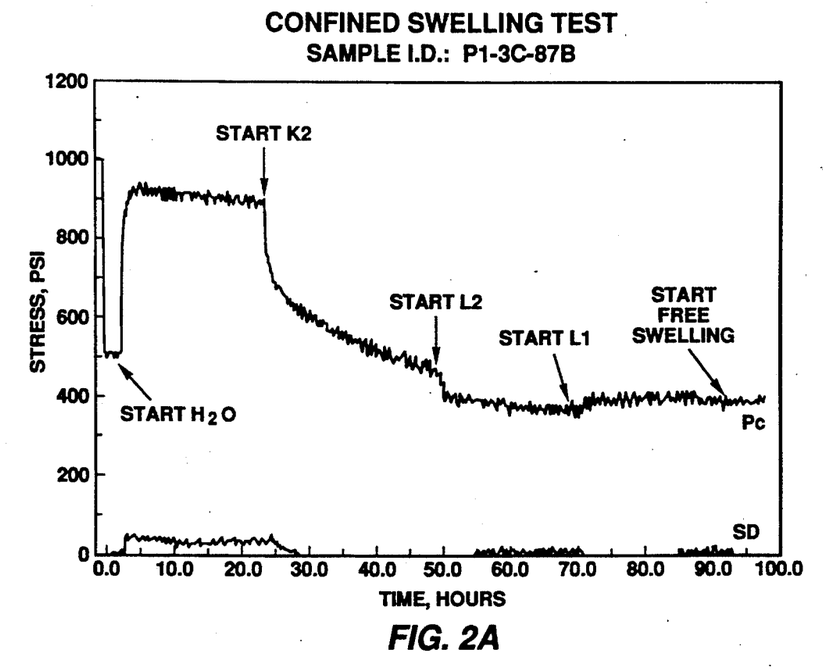
FIGS. 2A, 2B and 2C and 3A, 3B and 3C depict respectively the stress, total swelling pressure and strains measured when the confined swelling test described below was conducted two different times with the fluids set forth in Table 2, as described in more detail in Example 2.
Figure 2B:
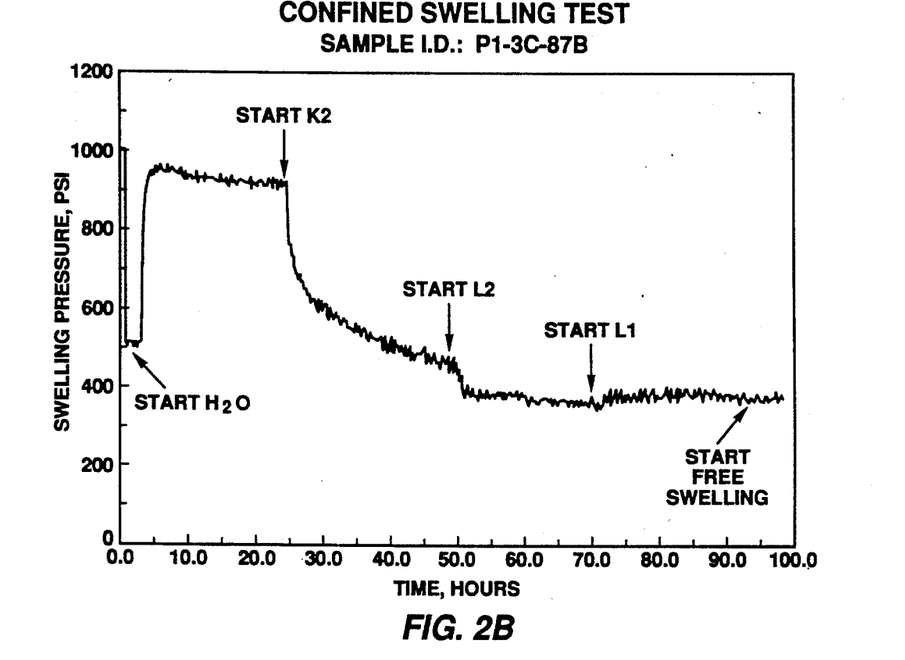
Figure 2C:
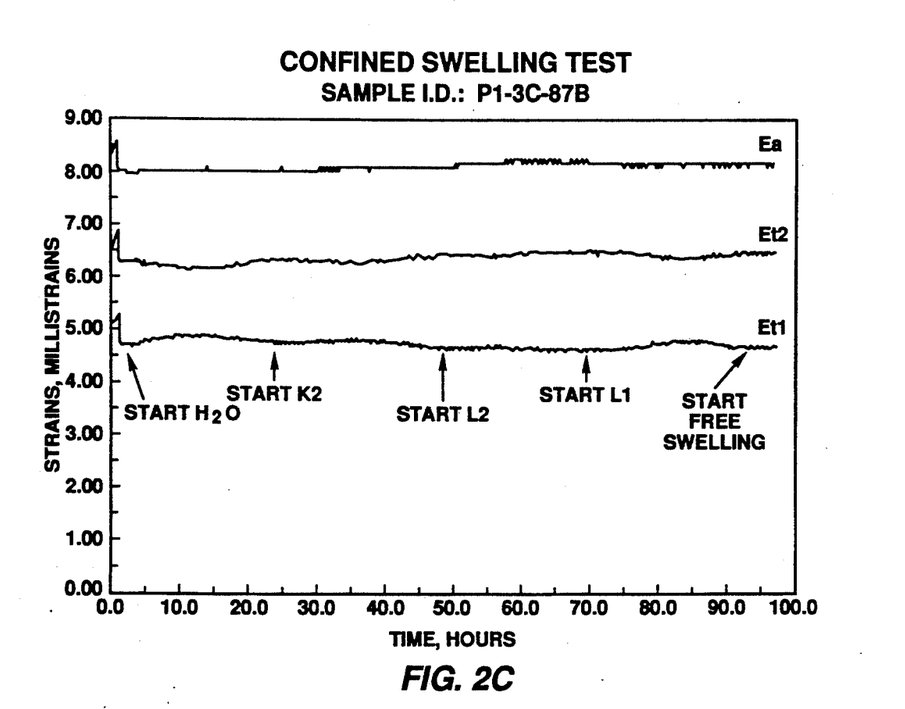
Figure 3A:
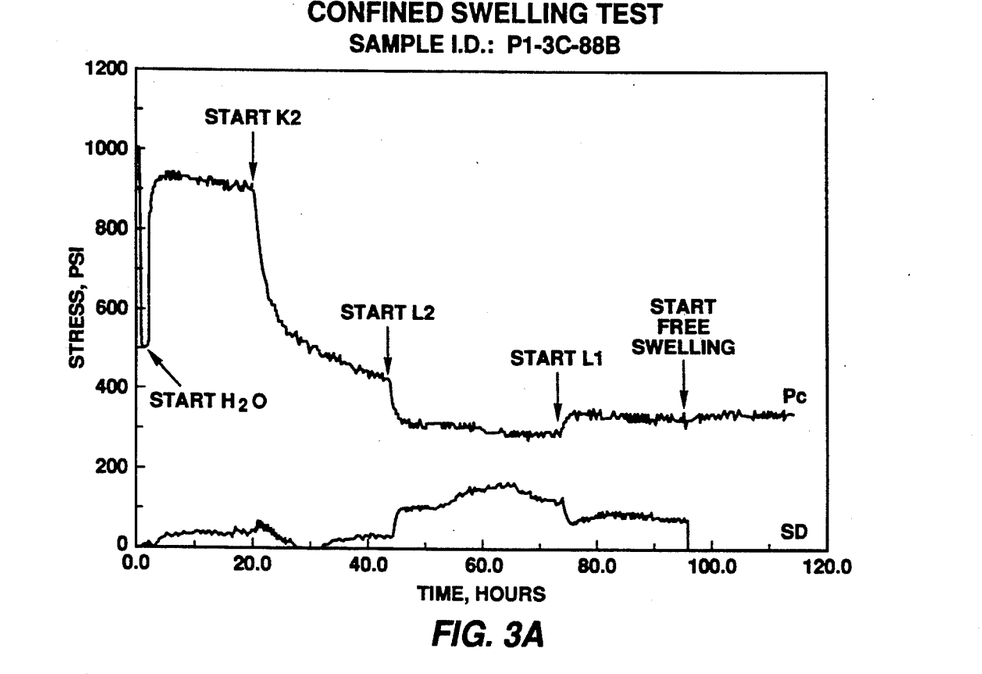
Figure 3B:
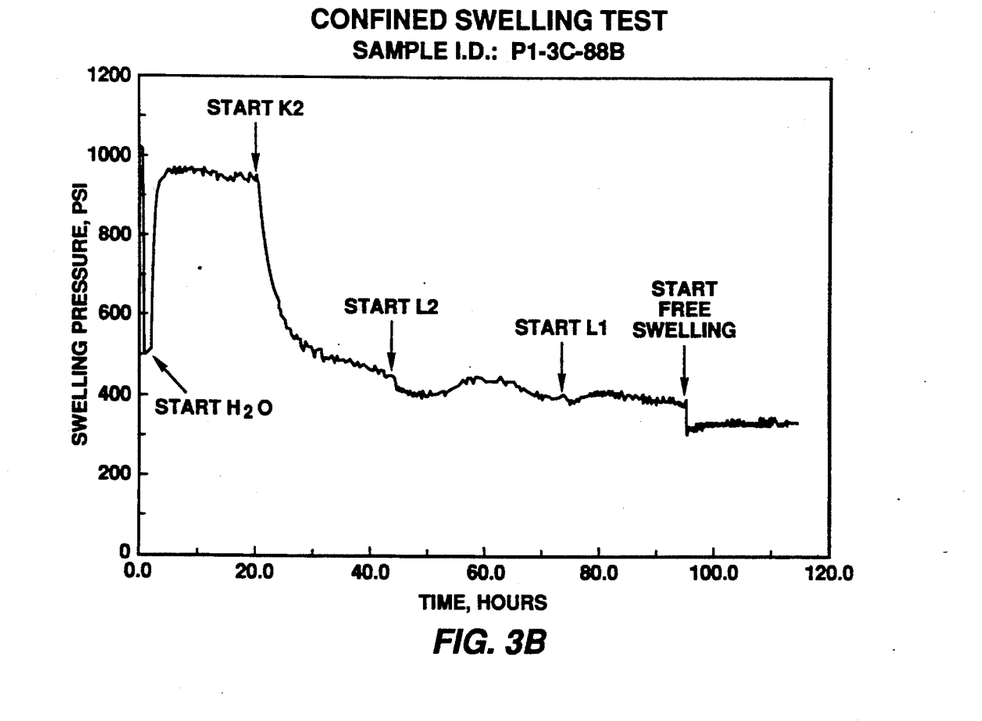
Figure 3C:
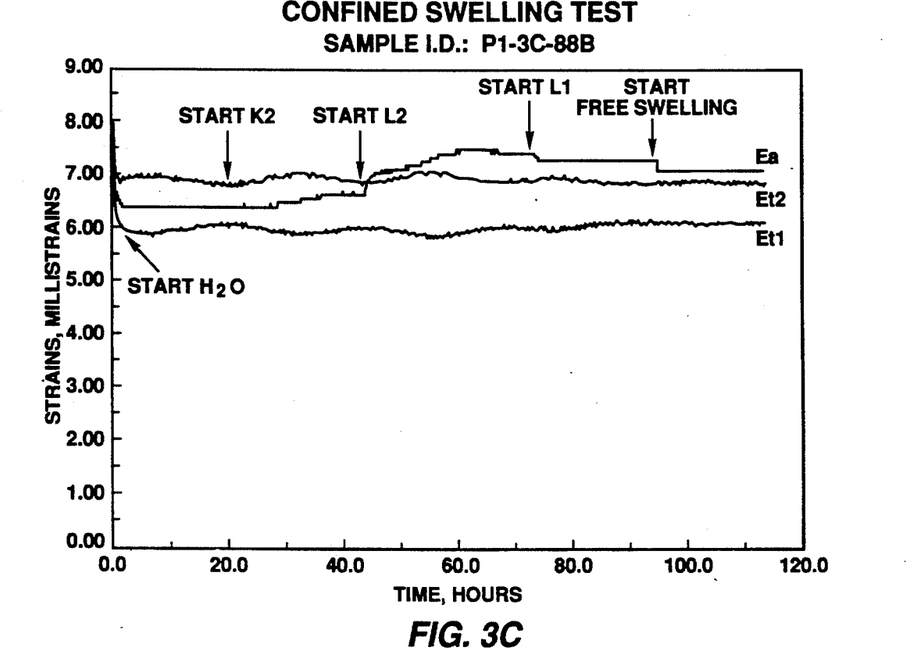

This test was run twice with three different test solutions. The 75 g/L potassium acetate solution had the same concentration of potassium ions as did the 57 g/L potassium chloride solution of Example 1. Review of FIGS. 2A, 2B and 2C, as well as FIGS. 3A, 3B and 3C, reveals a pattern strikingly similar to that of Example 1. Note, however, that addition of the diluted potassium acetate solution, with glycerine (L1), results in reduced inhibitive efficacy.

EXAMPLE 3

Figure 4A:
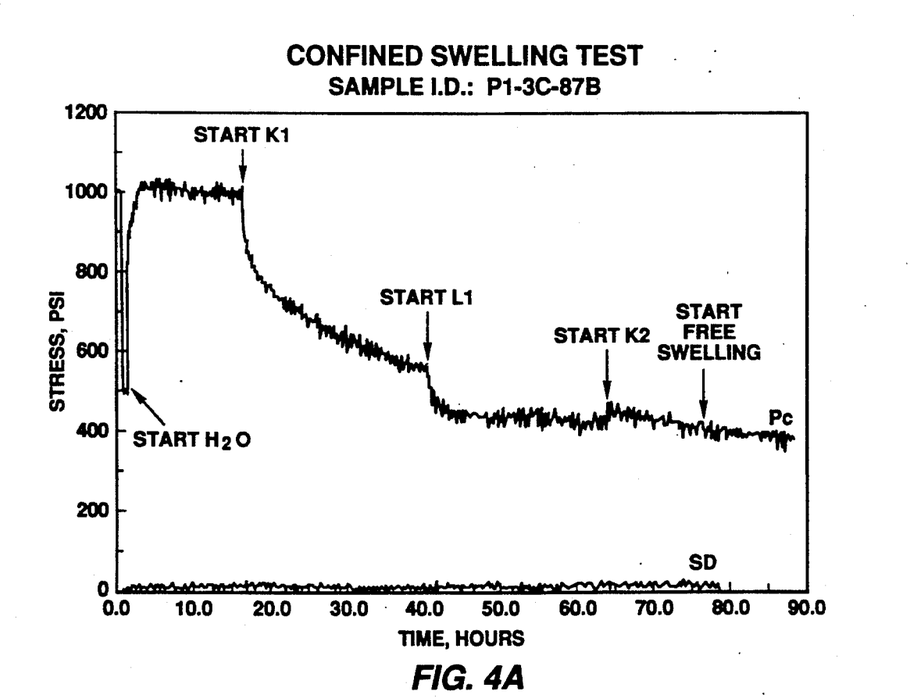
FIGS. 4A, 4B and 4C and 5A, 5B and 5C show the results of the same test, as run twice with the fluids set forth in Table 3, as described in more detail in Example 3.
Figure 4B:
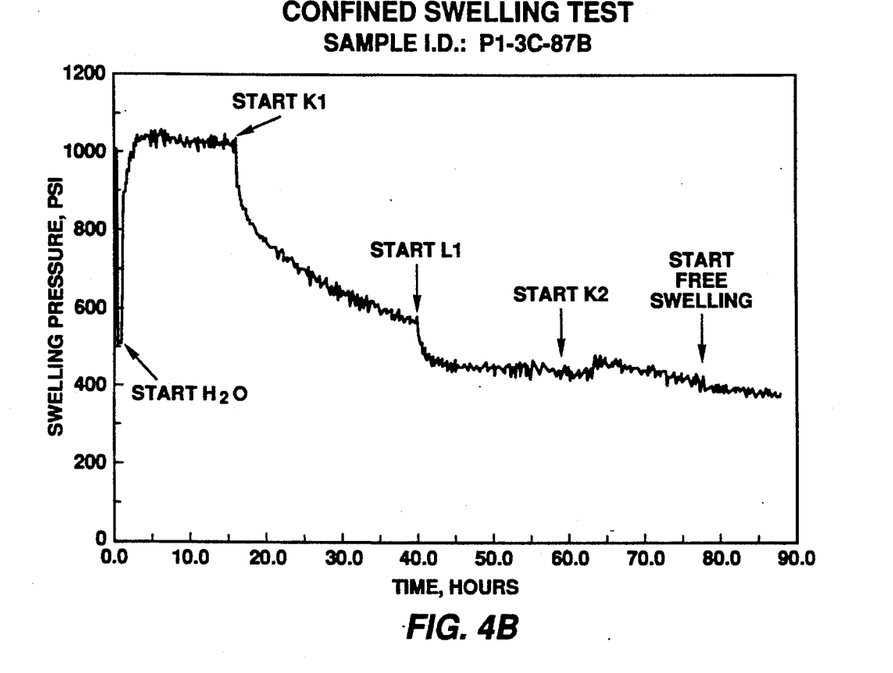
Figure 4C:
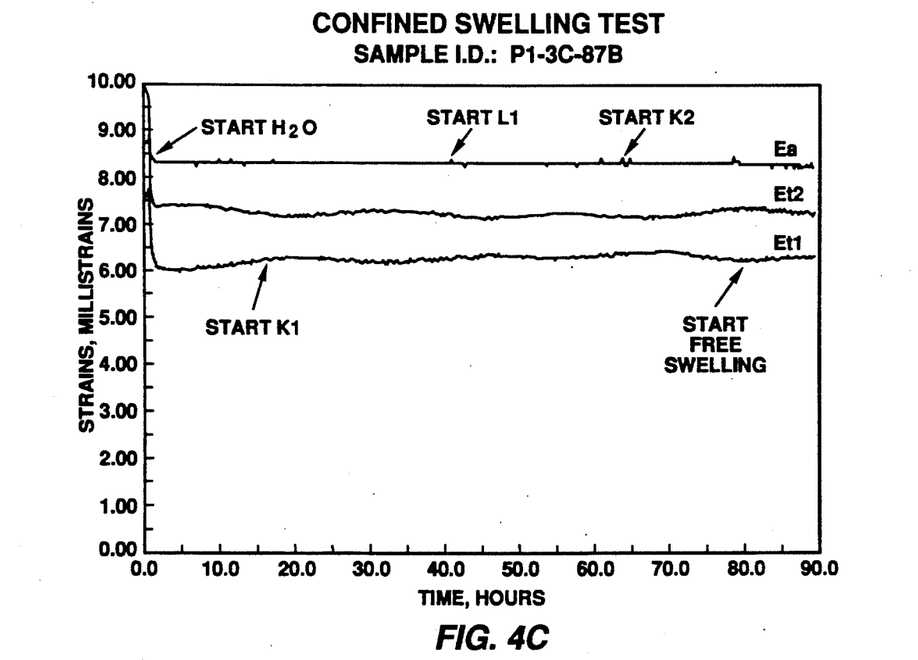
Figure 5A:
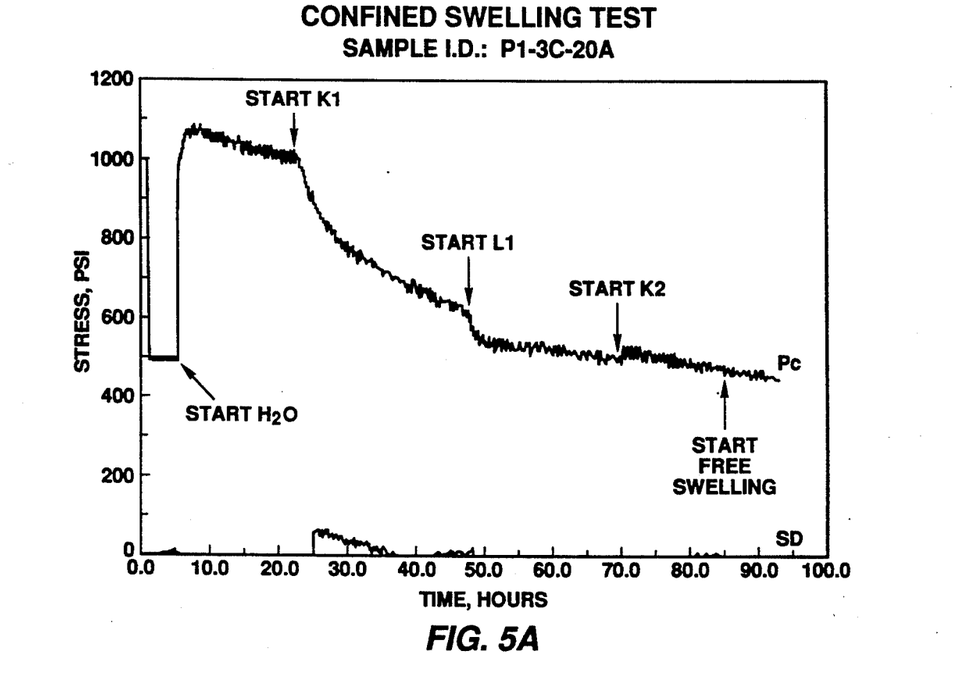
Figure 5B:
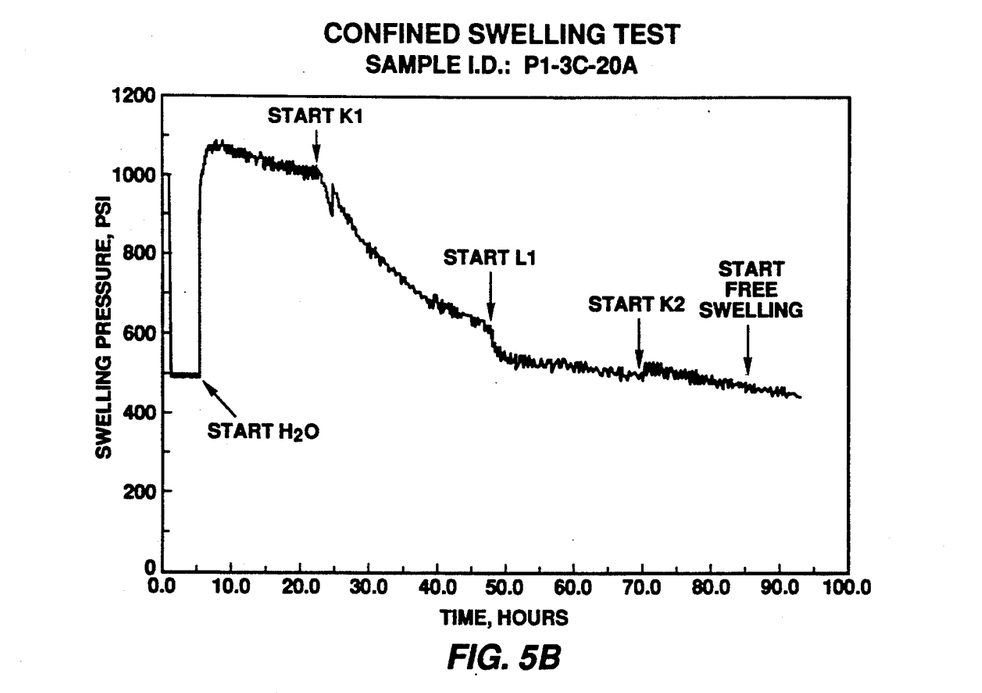
Figure 5C:
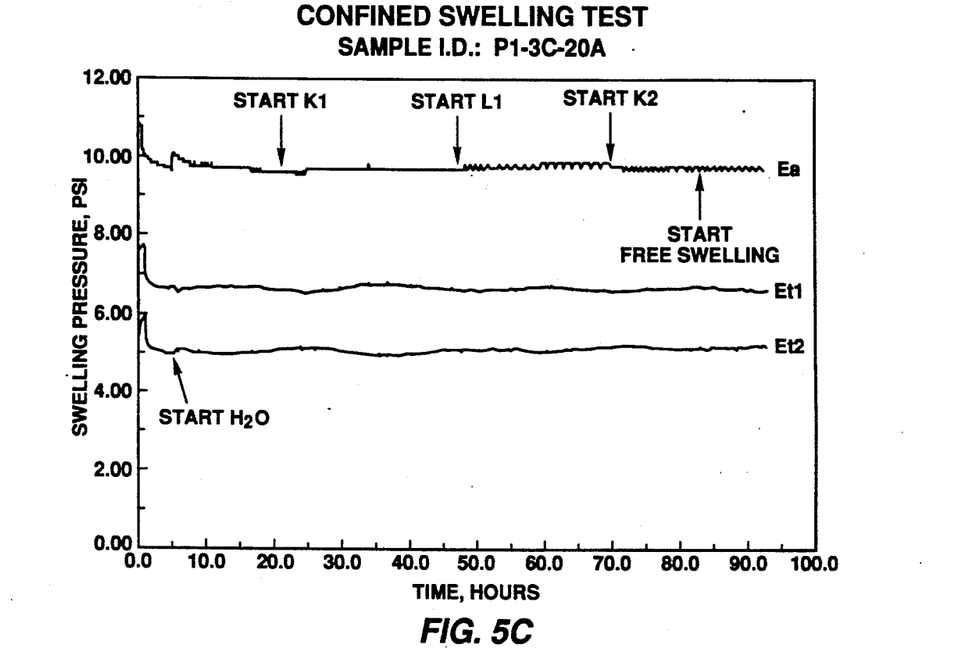

This test was also run with three different solutions, to determine the effect of change of potassium acetate concentration, without the presence of glycerine. FIGS. 4A, 4B and 4C, as well as 5A, 5B and 5C, demonstrate that the addition of some potassium acetate dramatically reduces swelling (K1), and that some further improvement is achieved by adding glycerine (L1). When the potassium concentration is doubled and the glycerine removed, the effectiveness of the solution (K2) remains approximately the same.

EXAMPLE 4

Figure 6A:
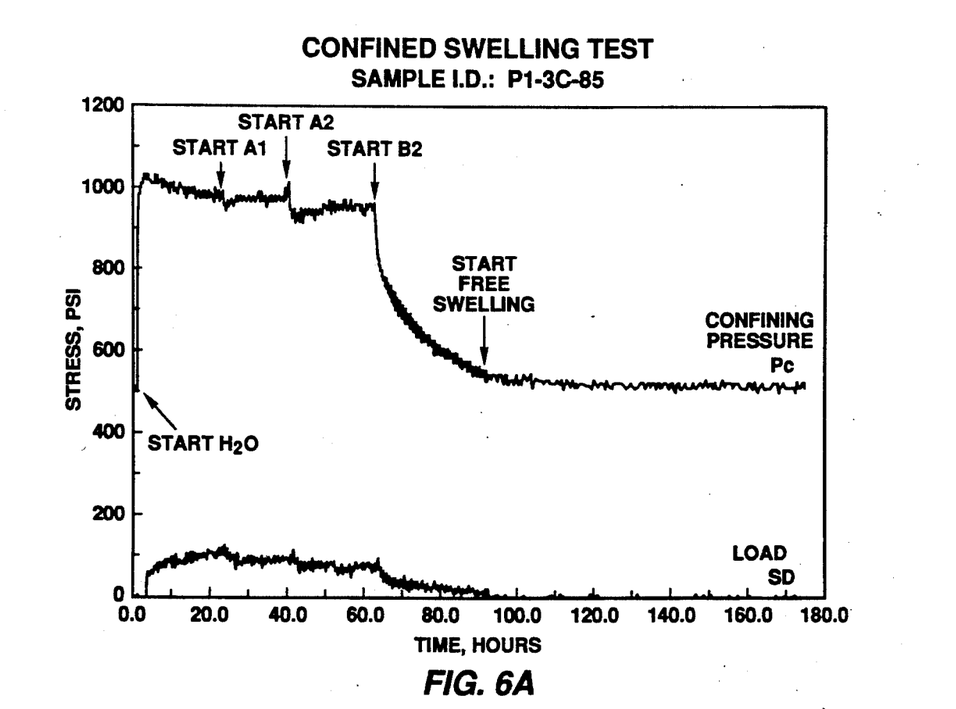
FIGS. 6A, 6B and 6C show the result of the same test, as run with the fluids set forth in Table 4, as described in more detail in Example 4.
Figure 6B:
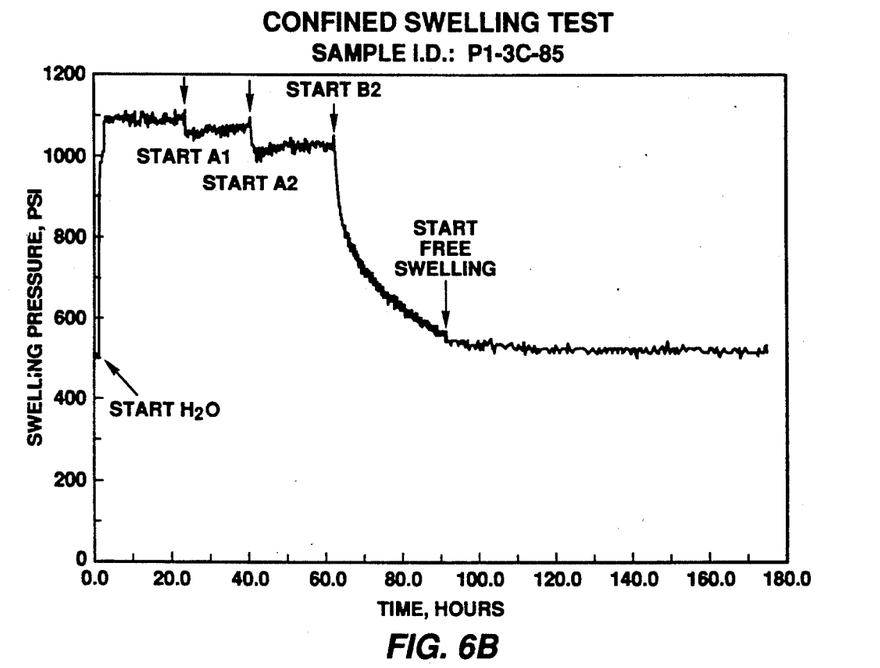
Figure 6C:
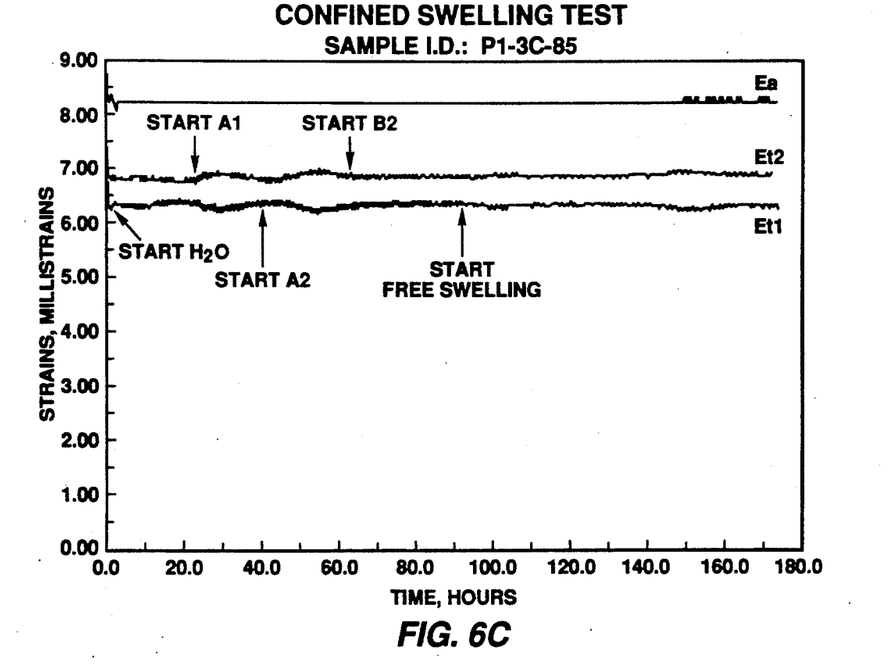

Finally, this test was run on the solution set forth in Table 4. As shown in FIGS. 6A, 6B and 6C, improvement in swelling reduction is not a strong function of glycerine concentration (A1, A2), however, addition of potassium ion (B2) substantially reduces swelling.

EXAMPLE 5

Standard acute toxicity to mysid shrimp *Mysidopsis bahia* tests were run on drilling fluid formulations according to the EPA Protocol "Drilling Fluids Toxicity Test," Federal Register, Volume 50, No. 165, Aug. 26, 1985, PP. 34631-34636. The fluid formulations and test results are given in Table 5. The results are given in parts per million concentration in the suspended particulate phase (SPP) that would be a lethal concentration to 50% ($LC_{50}$) of the test population in a 96-hour period. A concentration level of 30,000 ppm SPP is the current minimum acceptable toxicity limit. Values higher than 30,000 ppm SPP are acceptable. Fluids 1, 2, and 3 had high, acceptable values with lower 95% confidence limits of more than double the minimum acceptable 30,000 ppm SPP concentration limit.

TABLE 1

CONFINED SWELLING TEST SOLUTIONS
P1-3C-92B TEST

| CODE | SOLUTION |
|---|---|
| J-2 | 57 g/L KCl |
| C-2 | 57 g/L KCl/20% Glycerine |

TABLE 2

CONFINED SWELLING TEST SOLUTIONS
P1-3C-87B, P1-3C-88B TESTS

| CODE | SOLUTION |
|---|---|
| K-2 | 75 g/L KAc |
| L-2 | 75 g/L KAc/20% Glycerine |
| L-1 | 37 g/L KAc/20% Glycerine |

TABLE 3

CONFINED SWELLING TEST SOLUTIONS
P1-3C-87A, P1-3C-20A TESTS

| CODE | SOLUTION |
|---|---|
| K-1 | 37.5 g/L KAc |
| L-1 | 37.5 g/L KAc/20% Glycerine |
| K-2 | 75 g/L KAo |

TABLE 4

CONFINED SWELLING TEST SOLUTIONS
P1-C3-85 TEST

| CODE | SOLUTION |
|---|---|
| A-1 | 10% Glycerine |
| A-2 | 20% Glycerine |
| B-2 | 57 g/L KCl/10% Glycerine |

TABLE 5

| | Fluid 1 | Fluid 2 | Fluid 3 |
|---|---|---|---|
| Fluid Component, Amount | | | |
| Water, ml | 284.4 | 252.8 | 252.8 |
| Glycerine, ml | 31.6 | 63.2 | 63.2 |
| Potassium acetate, g | 26.2 | 26.2 | 00.0 |
| Potassium citrate, g | 00.0 | 00.0 | 28.9 |
| Xantan gum, g | 1.0 | 1.0 | 1.0 |
| Preserved starch, g | 4.0 | 4.0 | 4.0 |
| Polyanionic cellulose, g | 1.0 | 1.0 | 1.0 |
| Simulated drill solids, g | 75.0 | 75.0 | 75.0 |
| Acute Toxicity Test Results | | | |
| 96-Hour $LC_{50}$, ppm SPP | 76,488 | 74,426 | 71,711 |
| 95% Confidence Limits | | | |
| Lower Limit, ppm SPP | 67,500 | 67,500 | 64,000 |

TABLE 5-continued

|  | Fluid 1 | Fluid 2 | Fluid 3 |
|---|---|---|---|
| Upper Limit, ppm SPP | 100,000 | 100,000 | 89,000 |

What is claimed is:

1. A fluid for use in the drilling of wells, said fluid comprising glycerine and at least one potassium salt wherein said potassium salt is selected from the group consisting of potassium acetate, potassium citrate and potassium tartrate, wherein said glycerine constitutes between about 5 and about 30 volume percent of said fluid, and said at least one potassium salt constitutes between about 2 and about 15 weight percent of said fluid.

2. A fluid for use in the drilling of wells, said fluid comprising glycerine and at least one ammonium salt wherein said ammonium salt is selected from the group consisting of ammonium acetate, ammonium citrate and ammonium tartrate, wherein said glycerine constitutes between about 5 and about 30 volume percent of said fluid, and said at least one ammonium salt constitutes between about 2 and about 15 weight percent of said fluid.

3. A fluid for use in the drilling of wells, said fluid comprised of glycerine and potassium acetate, wherein said glycerine constitutes between about 5 and about 30 volume percent of said fluid, and said potassium acetate constitutes between about 2 and about 15 weight percent of said fluid.

4. A fluid for use in the drilling of wells, said fluid comprised of glycerine and ammonium acetate, wherein said glycerine constitutes between about 5 and about 30 volume percent of said fluid, and said ammonium acetate constitutes between about 2 and 12 weight percent of said fluid.

* * * * *